United States Patent Office 3,229,224
Patented Jan. 11, 1966

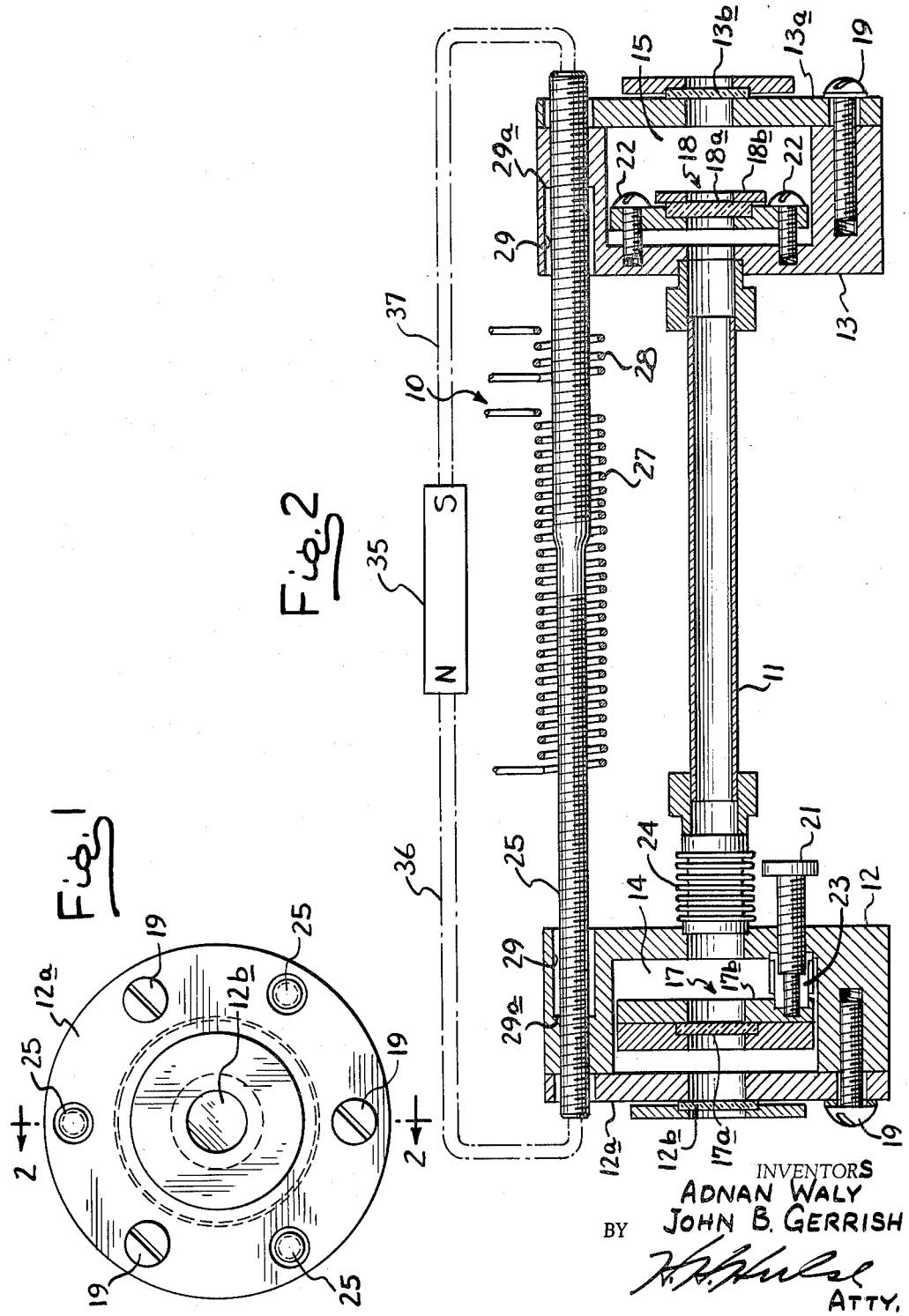

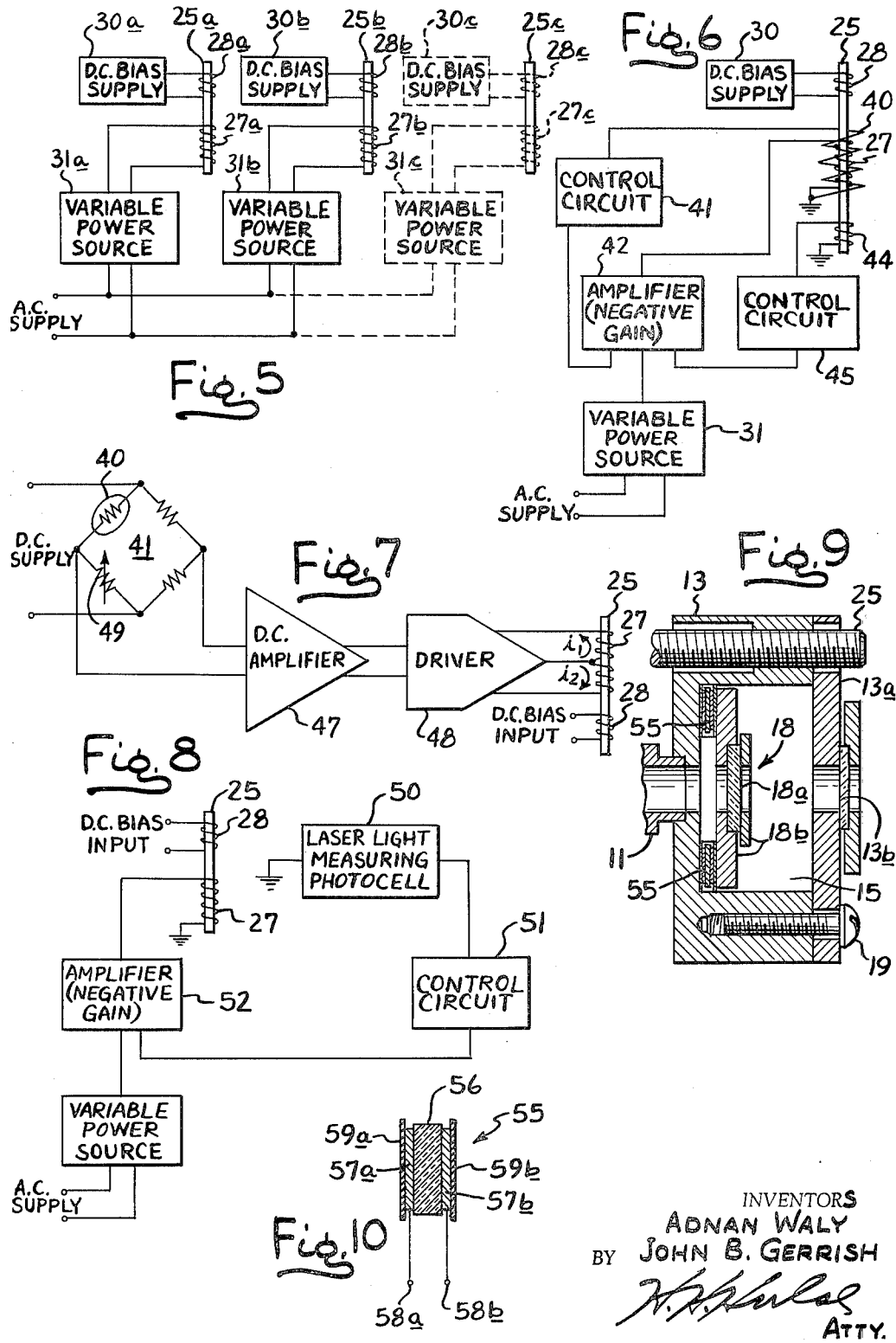

3,229,224
APPARATUS FOR MAINTAINING PARALLELISM AND DISTANCE BETWEEN TWO OBJECTS
Adnan Waly, Stamford, and John B. Gerrish, Old Greenwich, Conn., assignors to General Time Corporation, New York, N.Y., a corporation of Delaware
Filed July 3, 1963, Ser. No. 292,583
6 Claims. (Cl. 331—94.5)

The present invention relates to a positioning control and more particularly to means for maintaining the mirrors of a gaseous laser cavity at precise spacing and orientation.

In laser cavities such as the Fabry-Perot interferometer cavity, reflecting glass plates or optical mirrors are positioned at opposite ends of the cavity and the distance therebetween must be maintained constant to the same fraction of a wave length for good "lasing" action. The mirrors are held apart by a temperature-compensated arrangement including rods having a low temperature coefficient of expansion so that temperature changes have minimal effect thereon. Nevertheless, it has been found that the length of the rods changes sufficiently as a result of temperature changes to prevent satisfactory laser action or to cause a mode change in the cavity. Additionally, it has been found that the rods are affected by vibration at sonic or ambient frequencies.

Accordingly, a primary object of the present invention is to provide apparatus for maintaining a constant distance and parallelism between two bodies supported by a common member in a laser or similar precision device. In this connection, an object of this invention is to provide apparatus for compensating for changes in the dimensions of the supporting member in the face of temperature changes or in the face of vibration. A related object is to provide such apparatus for maintaining the length of a laser cavity constant to a fraction of a wave length.

An additional object of the present invention is to provide apparatus for insuring the desired operation of a laser in the face of wide temperature changes on the order of 100° C.

Still another object of the present invention is to provide apparatus for detecting temperature changes and vibrational changes in the length of the supporting structure and for compensating for changes in the dimensions of the supporting structure in the face of such changes. A more detailed object of this invention is to provide such apparatus which responds to changes in ambient conditions with a high degree of rapidity.

A further object of the present invention is to provide such apparatus which not only compensates for changes in spacing but which is equally effective in maintaining precise parallelism.

A more specific object of the present invention is to provide such apparatus which makes novel use of magnetostrictive effects.

A general object of the present invention is to provide a stable laser arrangement which is self-compensating, which may operate unattended in the face of extreme environmental changes and which is well suited for use outside the laboratory, for example, in space communications or the like.

Other objects and advantages of the invention will become apparent upon reading the attached detailed description and upon reference to the drawings, in which:

FIGURE 1 is an end view of a Fabry-Perot interferometer laser cavity;

FIG. 2 is a cross-section taken along line 2—2 of FIG. 1 illustrating the laser cavity modified in accordance with the teachings of the present invention;

FIG. 5 is a block circuit diagram of means for compensating for changes in the length of the supporting structure of the laser cavity;

FIG. 6 is a block circuit diagram illustrating means for detecting changes in the temperature and length of the supporting structure and means for compensating therefor;

FIG. 7 is a more detailed diagram of the temperature detecting portion of the compensating circuitry illustrated in FIG. 6;

FIG. 8 is a diagram showing a modified version of the detecting and compensating circuit illustrated in FIG. 6;

FIG. 9 is a fragmentary view of FIG. 2 modified in accordance with another aspect of the present invention; and FIG. 10 is an enlarged view of a piezoelectric body utilized in FIG. 9.

Figure 3:
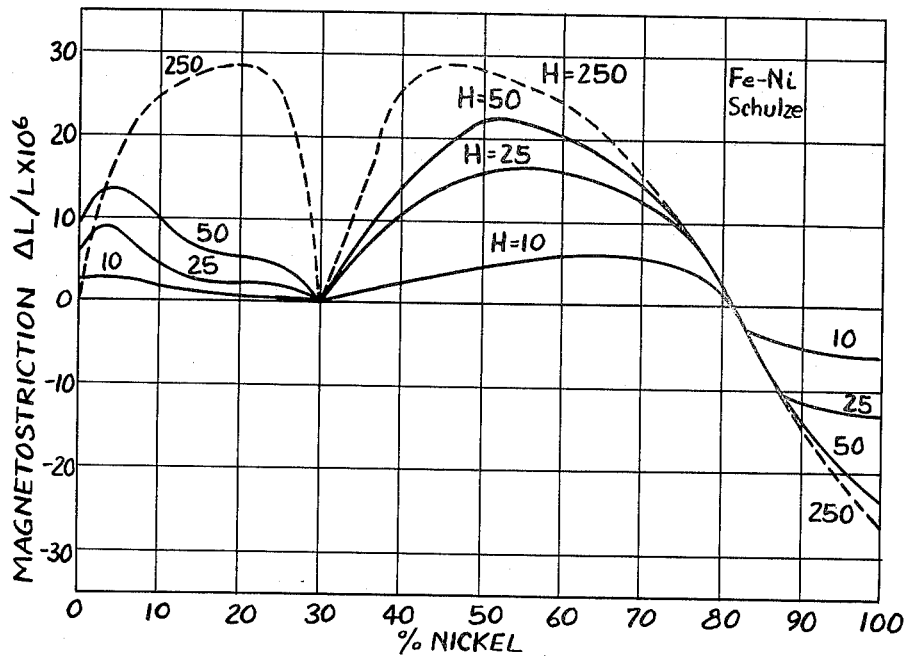
FIG. 3 is a graph illustrating the magnetostrictive characteristics of supporting rods for the laser cavity illustrated in FIGS. 1 and 2.

While the invention has been described in connection with certain preferred embodiments, it is to be understood that the invention is not to be limited to the disclosed embodiments but, on the contrary, the invention is intended to cover the various modifications and equivalent arrangements included within the spirit and scope of the appended claims.

Referring to FIGS. 1 and 2, a Fabry-Perot interferometer laser cavity arrangement 10 is illustrated. The tube 11 is supported at opposite ends by brass header members 12 and 13. As may be seen, openings 14 and 15 are provided in the header members wherein optical mirror assemblies 17 and 18 are positioned, the openings 14 and 15 being accessible through header plates 12a and 13a which are secured thereto by means of screws 19. Additionally, glass viewing windows 12b and 13b are mounted on the header plates 12a and 13a axially disposed from the mirror assemblies 17 and 18. The mirror assemblies 17 and 18 respectively include mirrors or reflector members 17a and 18a and mirror support mounts 17b and 18b. In the illustrated embodiment, mirror assembly 17 is secured to the brass header member 12 by means of three forward expanding adjusting screws 21, only one of the adjusting screws being illustrated. Likewise, the mirror assembly 18 is secured to the header member 13 by means of three forward expanding screws 22, only two of the screws being illustrated. These screws are preferably constructed of a material such as Invar and allow for adjusting the relative positions of the mirror assemblies with respect to the inner ends of the header members, the screws being disposed so that adjacent screws are 120 angular degrees apart. As may be seen, the screws 22 are only accessible when the header plate 13a is removed whereas the screws 21 are accessible from without the header member 12. Further, the adjusting screws 21 have differentially pitched threads so that fine adjustment may be achieved. For example, the threads thereof may be of 5 mm.–1.33 (based upon the International Standard Metric Screw Thread standards) and ¼ inch–32 respectively. For the purpose of sealing the header member 12 adjacent the screws 21, an expandable sealing member 23 (schematically illustrated), for example, a brass bellows, is disposed between the header member 12 and the mirror assembly 17.

Since means for producing inverted population in the gaseous mixture in the tube 11 do not constitute a portion of the present invention, such means have not been disclosed. However, it will be readily apparent to those skilled in the art that any conventional means may be employed for this purpose and the description will proceed with it being assumed that the desired inverted population is being produced in the gaseous mixture. In like manner, no means have been disclosed for deriving an output from the laser cavity since such means also do not constitute a part of the present invention and any conventional means may be likewise utilized for this purpose.

In accordance with the present invention, the brass header members 12 and 13, and therefore the mirrors 17a and 18a, are maintained substantially parallel and a desired distance apart by means of three supporting rods 25 having a low temperature coefficient of expansion and having magnetostriction characteristics. While only one of the rods is illustrated in FIG. 2, it may be seen in FIG. 1 that the rods 25 are disposed symmetrically with adjacent rods 120 angular degrees apart. Preferably, the rods are constructed of a nickel-iron alloy, such as Invar which has an expansion coefficient between 1.6 and $0.6 \times 10^{-6}$ per degree C. depending upon the degree of cold work or cold reduction. In such cavity arrangements, it is often desirable for the mirrors to be maintained apart a distance on the order of 1 meter. As is well known to those skilled in the art, stimulated emission at optical wave lengths in such devices is dependent upon the distance between the mirrors being such as to form a resonant cavity. Consequently, in order to derive the desired output, the distance between the mirrors must be set to a desired length and this distance must be maintained substantially constant while also maintaining the mirrors substantially in parallel. For the purpose of initially presetting the distance between the mirrors 17a and 18a in lieu of adjusting the screws 21 and the screws 22, the ends of the rods are threaded into the header members 12 and 13 with a differential pitch so that "coarse" adjusting movement of the header members may be effected thereby. For example, each rod may carry on one end a ⅝–18 thread and on the other end a ½–20 thread.

With a distance between the mirrors of 1 meter and with the laser active medium being formed of a mixture of helium at a partial pressure of 1 mm. Hg and neon at a partial pressure of .1 mm. Hg, the mirrors are approximately 800,000 wave lengths apart. In view of the fact that the laser quasi-standing wave pattern can only be maintained if the mirrors are maintained substantially parallel and the distance between the mirrors is maintained constant to a fraction of a wave length, it will be appreciated that the length of the rods 25 is critical. Even if it were possible for thermal changes to affect all the rods equally and thus maintain parallelism, changes of the order of approximately 100 wavelengths would lead to frequent mode jumps and considerable cavity pulling, a highly undesirable situation since a continuous laser output is desired. Moreover in practice the changes in length of the respective rods are unequal, thus destroying the parallelism which is also necessary for satisfactorily continuous laser operation. If it is assumed that Invar rod material having an expansion coefficient of $1.0 \times 10^{-6}$ per degree C. is utilized, it will be apparent that the Invar rod length will be altered $10^{-4}$ centimeters if the rod is 1 meter in length and the temperature thereof rises 1° C. Accordingly, if the laser is required to operate within a temperature range of 100° C., which is not an unreasonable specification for commercial, military or space use, the total change in length of the Invar rod would amount to $10^{-2}$ centimeters. From the foregoing, it will be apparent that discontinuous operation of the laser will result in the face of such temperature changes. Additionally, it has been found that the lengths of the rods are affected by vibration at sonic frequencies or the like. For the purpose of allowing the rods 25 to expand and contract without damaging the cavity 11, an expansion joint 24 (schematically illustrated) is interposed between the central portion of the tube 11 and the header member 12.

means are provided for altering the state of magnetization of the nickel-iron alloy rods and thus magnetostrictively changing the dimensions of the Invar rods 25 so as to compensate for changes in the length caused due to temperature changes or vibration.

For this purpose, a compensating coil or winding 27 is provided on each of the rods 25 to which a current signal is applied to induce a field altering the state of magnetization of the associated rod. In nickel-iron alloys such as Invar 36 (36% nickel), the magnetostrictive effect is positive, i.e., any magnetic field will elongate the rod. Accordingly, in order to allow for decreasing as well as increasing the length of the rods 25, the rods are biased to a desired reference level. For this purpose, a bias coil or winding 28 is provided on each of the rods to which a biasing current is applied. Thus, when current flows through the compensating coil 27 on a rod 25 in one direction, a magnetic field is induced which causes the state of magnetization of the rod 25 to be changed in one direction to cause the length thereof to be increased and, when current flows in the opposite direction, a magnetic field is induced which tends to neutralize the bias field, changing the flux in the opposite direction so that the length of the rod is decreased.

Preferably, bias coils 28 are multiple-winding coils capable of producing coaxial magnetic fields in the rods on the order of 25 oersteds to establish the reference state. The compensating coils 27 are also preferably tapped, multiple-winding coils capable of producing coaxial magnetic fields in the associated rod on the order of 100 oersteds. Some permanent magnetization will be imparted to the rods 25 after prolonged biasing thereof which will aid the bias field. Accordingly, it is desirable that the field capability of the compensating coils be substantially greater than the capability of the bias coils so as to be capable of overcoming the combined effect of the bias field and the permanent magnetization. Additionally, although the compensating coils 27 and the bias coils 28 are illustrated as being separate coils, it will be apparent that a single coil may serve this dual purpose and the invention is intended to cover the use of a single coil. Under such conditions, a bias current would be applied to the single coil and compensation would be achieved by changing the level of current flow therethrough.

Figure 4:
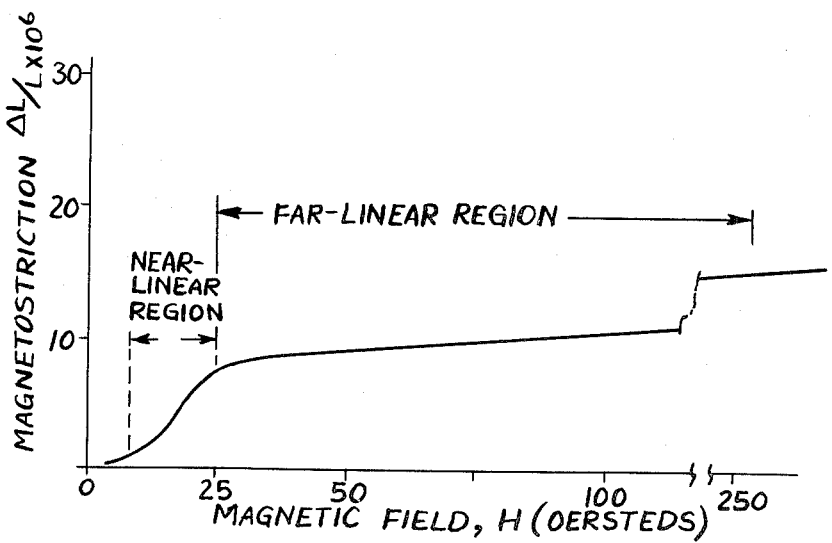
FIG. 4 is a graph illustrating the magnetostrictive characteristics of "Invar 36," an iron alloy containing 36% nickel.

Referring to FIG. 3, a graph is shown which illustrates magnetostriction characteristics for Invar having various percentages of nickel and having various coaxial fields produced therein. A more refined graph illustrating the relationship between magnetostriction and various levels of coaxial magnetic fields for Invar 36 (36% nickel) may be seen by reference to FIG. 4. Preferably, magnetostrictive operation of such materials is confined to the near-linear region, as illustrated in FIG. 4, so that a greater response may be obtained with lesser power than may be obtained in the far-linear region.

It should also be kept in mind that dimensional changes of the brass header members 12 and 13 in the face of temperature changes may be compensated for by altering the state of magnetization of the rods 25 and the invention is intended to cover the compensation for changes in length of the entire supporting assembly for the mirrors 17a and 18a. Additionally, the brass header members 12 and 13 allow for some back expansion which aids in compensating for expansion of the rods 25. Referring again to FIG. 2, recesses 29 are provided in the header members for receiving the rods 25. Accordingly, the rearward seats 29a of the recesses determine the effective length of the rods, i.e., the effective length is that disposed between the seats 29a which function as reference points. The portion of the header member 12 extending to the right of seat 29a therein and the portion of header member 13 extending to the left of seat 29a therein expand in directions opposite to the direction of expansion of the rods Thus, expansion of these portions of the header members compensates to some extent for expansion of the rods 25. The brass header members may, for example, have a linear coefficient of expansion on the order of $20 \times 10^{-6}$ per degree C.

Referring to FIG. 5, three rods 25a–25c, corresponding to the rods 25 illustrated in FIGS. 1 and 2, are shown having compensating windings 27a–27c and bias windings 28a–28c wound thereon. For the purpose of supplying biasing current to the bias windings, D.-C. bias supplies 30a–30c are provided which are standard, manually adjustable D.-C. supplies so that the state of magnetizations of the rods may be placed at desired reference or bias levels. Additionally, for the purpose of supplying current to the compensating winding so as to induce magnetic fields which aid or buck the biasing magnetic fields, variable power sources 31a–31c are provided which are standard, manually variable units powered by an A.-C. supply. In operation, an operator visually detects a change in the lasing of the cavity in response to changes in the length of the laser cavity support which changes the cavity length. The operator then adjusts the power sources 31a–31c to alter the length of the rods 25 until the desired lasing is again detected. Changes in the lasing of the cavity may be visibly detected by projecting the laser beam upon a screen and observing the resulting pattern and brightness.

In accordance with another aspect of the present invention, the biasing means and compensating means may be omitted from one of the rods so that means are provided for varying the length of only two of the rods 25. For example, the biasing and compensating circuitry associated with the rod 25c in FIG. 5, as illustrated in phantom lines, may be omitted or left idle. Under such conditions, the parallelism between the mirrors 17a and 18a and the distance therebetween may be altered by altering the states of magnetization and thus the lengths of the rods 25a and 25b.

In lieu of the biasing means described hereinabove, other biasing means may be utilized for placing the rods at a desired reference or bias magnetization level. For example, as illustrated in phantom lines in FIG. 2, a permanent magnet 35 may be magentically coupled by any desired means to the opposite ends of each Invar rod 25 such as by means of links 36 and 37 of permeable material. With such an arrangement, the associated rod 25 will be placed at a state of magnetization determined by the strength of the magnet and the drop of magnetic potential in the links. Accordingly, the invention is intended to cover the use of both electromagnetic and permanently magnetic biasing means.

In accordance with still another aspect of the present invention, means are provided for detecting the temperature changes in the rods 25 and for correctively controlling the flow of current through the compensating coil 27 in accordance therewith. For this purpose, a thermistor, a resistance thermometer, a thermocouple or the like may be associated with each rod or a selected rod.

Referring to FIG. 6, an electrical temperature sensing element 40 is associated with the rod 25 to sense temperature changes therein. The element 40 may comprise a strand of resistance thermometer wire wound about each of the rods 25 or it may be a chain of series-connected thermisters mounted along the rod in contact therewith. Preferably the temperature element extends the length of the rod so that the average temperature is detected thereby. The temperature element is in turn connected to a control circuit 41 to control the output thereof in accordance with the instantaneous resistive value thereof. If the temperature element 40 is, for example, a thermistor chain, the control circuit in turn controls the output of a negative gain amplifier 42 so that, as the resistance of the thermistors 40 increases, and the output of the control circuit increases correspondingly, current is caused to flow through the compensating winding 27 in a direction such that the magnetic field induced thereby bucks the bias magnetic field. This results in a reduction in the length of the rod 25 which will compensate for expansion due to the rise in temperature of the rod detected by the thermistors 40. Conversely, as the resistance of the thermistors drops, an aiding magnetic field is induced which results in an increase in the rod length. From the foregoing, it is apparent that means have been provided for automatically compensating for changes in the length of the rod 25 in the face of temperature changes.

A variable power supply 31, corresponding to the power supplies illustrated in FIG. 5, is also associated with the amplifier 42 so that the length of the rods 25 may be manually adjusted.

Additionally, in keeping with the invention, means are provided for detecting changes in rod lengths induced by vibration at sonic or ambient frequencies. Referring to FIG. 6, a magnetostrictive pickup winding 44 may be wound on the rod 25 for detecting changes in the length of the rod 25 in the face of vibration. Such is the case since it has been found that, in response to vibrational changes in the length of nickel-iron alloys such as Invar, a change in flux occurs within the rod which will induce a current in the pickup winding 44 which is proportional to the change in length. The current induced in the input winding 44 may in turn be utilized to control the output of a control circuit 45 which also feeds the negative gain amplifier 42 so that the state of magnetization of the rod is altered by applying current to the compensating coil 27. Accordingly, the length of the rod 25 is altered and vibrational compensation is provided, i.e., compensation is provided for changes in length due to vibration at frequencies such as sonic frequencies.

Preferably, means are associated with each rod 25 for detecting changes in the length thereof due either to temperature or vibration and for providing compensation. However, it will be apparent that any desired combination of such sensing means and the related compensating means may be provided for a cavity arrangement. For example, sensing means may be associated with one of the rods having no compensating means and in turn may control compensating means associated with the other two rods.

Referring to FIG. 7, a more detailed diagram of the temperature responsive network shown in FIG. 6 is illustrated. It may be seen that the thermistor chain 40 is connected in the control circuit 41 which is shown as a standard bridge network powered by a D.-C. supply. The output of the bridge network is in turn fed to a D.-C. amplifier 47 which controls the operation of a driver 48. The driver may take the form of a transformer coupled, push-pull amplifier wherein the relative amplitudes of the output currents $i_1$ and $i_2$ are determined by the amplitude and polarity of the D.-C. amplifier output. A typical push-pull amplifier is illustrated in the text, Applied Electronics, by Truman S. Gray, beginning with page 460 (a publication of the Technology Press, Massachusetts Institute of Technology, John Wiley & Sons, Inc., New York, March 1955), which may be readily adapted to respond to the D.-C. amplifier output. As the temperature of the rod 25 varies, the resistance of the thermistors 40, and hence the output of the bridge, vary correspondingly. Accordingly, the output of the D.-C. amplifier varies above and below a reference level determined by the bridge output when the rod 25 is at the desired temperature level. Preferably, a variable resistor 49 in the bridge network is preset so that a "null" or zero bridge output is provided when the rod 25 is at the desired temperature level. Under such conditions, the driver 48 will be preset so that the currents $i_1$ and $i_2$ are equal and, therefore, no resultant current flows in the compensating winding 27. Thus, when a bridge output of one polarity is provided, $i_1$ will be greater than $i_2$ so that a magnetic field is induced which causes the rod length to be altered in one direction. Conversely, when the bridge output is of the other polarity, $i_2$ will be greater than $i_1$ and the rod length will be altered in the opposite direction.

In keeping with the latter aspect of the invention, other sensing means may be provided for controlling the compensating means. For example, as illustrated in FIG. 8, a laser light measuring photocell 50 is associated with the laser cavity so as to detect changes in the amount of light which indicates changes in the lasing effect. The output of the photocell 50 is transmitted to a control circuit 51 so as to control the output thereof in accordance with the detected change in light. In turn, the control circuit output is transmitted through a negative gain amplifier 52 which controls the amount of current flowing through the compensating winding 27. Since the controlling operation of this arrangement is similar to the previously-described operation of the sensing means illustrated in FIG. 6, further details thereof need not be set forth. Suffice it to say that the length of the rod 25 is varied correctively in accordance with the photocell 50 output to maintain a condition of peak laser output.

It is also feasible to detect changes in the frequency of the laser output instead of changes in the magnitude thereof, and to thereby generate an error signal which is fed back to correctively control the laser output and thus compensate for changes. In a typical application, the output of the laser which it is desired to control would be mixed with the output of another laser of known frequency in a device such as a photomultiplier tube, semiconductor optical mixing diode, or any other photoresponsive device capable of producing a beat frequency output representing the difference between the two laser frequencies. The photoresponsive device would then be connected to a conventional circuit which would oscillate at the much lower difference or beat frequency. The output of this circuit would then be applied to an FM detector to generate a control voltage proportional to the beat frequency. This control voltage can then be used to tune the laser in the manner described herein.

In accordance with another feature of the present invention, electrostrictive compensating means may be provided for controlling the distance between the mirrors 17a and 18a rather than magnetostrictive means. More specifically, piezoelectric bodies may be disposed between at least one of the mirror support mounts and the associated header member so as to control the relative position therebetween in response to the application of current thereto.

Referring to FIG. 9, a portion of the cavity arrangement of FIG. 2 is illustrated wherein piezoelectric crystals or ceramic materials 55 have been disposed between the header member 13 and the support mount 18b of the mirror 18a in lieu of the screws 22. An enlarged view of one of the piezoelectric bodies is illustrated in FIG. 10. As may be seen by reference thereto, the piezoelectric bodies include a central portion 56 having electrodes 57a and 57b disposed on opposite sides thereof to which input terminals 58a and 58b are connected. Additionally, insulation 59a and 59b is provided to insulate the electrodes from the mirror mount 18b and the header member 13. The piezoelectric material may, for example, be barium titanate.

When a voltage of one polarity is applied across a piezoelectric body, the body expands and, conversely, when the opposite polarity is applied, the body contracts. Only two such bodies are illustrated in FIG. 9; however, as with the magnetostrictive compensating means associated with the rods 25, three symmetrically positioned bodies may be provided and the effect thereof will correspond to the effect of the magnetostrictive compensating means described above. Suffice it to say that the distance between the mirrors 17a and 18a may be maintained constant by applying a voltage across the electrodes in a direction which causes contraction or expansion depending upon whether the distance therebetween has increased or decreased. If only two piezoelectric bodies are energized, it will be apparent that parallelism between the mirrors may be controlled.

Additionally, it will be apparent that in such an arrangement, the third body may be employed as a piezoelectric vibration-sensing means used as described hereinabove. Further, any desired combination of the magnetostrictive compensating and/or sensing means and the electrostrictive compensating and/or sensing means may be utilized.

Since the details of the circuitry for sensing vibrations and for controlling the voltage applied to the piezoelectric bodies 55 will correspond to that described hereinabove with respect to the magnetostrictive compensating winding, the details thereof will not be set forth, but rather reference may be made to the circuitry and description for magnetostrictive compensation, the piezoelectric bodies merely being connected in the circuitry in place of the pickup coil 44 and compensating windings 27, and the bias windings 28 being deleted.

In the foregoing, more detailed circuitry has been illustrated for responding to changes in the resistance value of the thermistor 40 (FIG. 7), whereas no such detailed circuitry has been illustrated for responding to current induced in the pickup winding 44 or for responding to the output of the photocell 50. The details of the latter circuits have not been illustrated since, as will be apparent to those skilled in the art, the details thereof will be similar to that illustrated in FIG. 7. In this connection, only a single driver 48 need be provided for responding to amplified outputs from the bridge network 46 and from the pickup winding 44, for the outputs being connected in series to cumulatively control the driver, i.e., to control the driver in accordance with the summation of the amplified outputs which may aid or buck one another.

In the above description, no details have been disclosed as to the fittings used for connecting the various disclosed components of the interferometer cavity since such fittings are well known in the art and do not constitute a portion of the present invention.

While the invention has been described in connection with maintaining a desired distance and parallelism between reflecting mirrors in a laser cavity, it will be understood that the invention is not limited thereto and is applicable more generally in the precise control of the distance between any two bodies commonly supported. For example, the invention may also be used for maintaining a constant length of, e.g., a meter stick or a delay line.

What we claim is:

1. In apparatus for maintaining a constant length, the combination which comprises, a magnetostrictive body subject to changes in length in response to the application thereto of prescribed effects, means in thermal contact with the body for directly sensing the temperature of the same, and means associated with the temperature sensing means for applying a varying magnetic field to the body in accordance with the sensed temperature so that the length of the body is changed in a direction to compensate for thermal effects thereon.

2. In apparatus for maintaining a desired spacing, the combination which comprises, a body having a surface, a selected reference surface, means for mounting the body adjacent the reference surface so that the surface of the body is spaced a desired distance therefrom, the mounting means being subject to changes in the dimensions thereof in response to temperature changes, piezoelectric material interposed between the body and the mounting means, means in thermal contact with the mounting means for directly sensing the temperature of the same, and means responsive to the sensed temperature for electrically energizing the piezoelectric material in accordance therewith so that the dimensions thereof are altered and the distance between the body and the reference surface is also altered.

3. In apparatus for providing amplification by stimulated emission of radiation, the combination which comprises, an interferometer cavity including a pair of reflecting members, a supporting structure holding the reflecting members in a desired spaced relationship, means in thermal contact with the supporting structure and directly responsive to temperature changes in the supporting structure for producing an electrical signal having an amplitude corresponding to the amount of change in temperature and having a polarity corresponding to the direction of change, and means responsive to the signal for altering the length of the supporting structure in accordance with the amplitude and polarity thereof so that the reflecting members are maintained a desired, preselected distance apart.

4. In apparatus for providing amplification by stimulated emission of radiation, the combination which comprises, an interferometer cavity including a pair of reflecting members, a supporting structure which supports the reflecting members, means coupled with the supporting structure and directly responsive to changes in length of the supporting structure induced by vibration for producing an electrical signal having an amplitude corresponding to the change in length and having a polarity corresponding to the direction of change, and means responsive to the signal for altering the length of the support structure so that the length thereof is maintained constant and the reflecting members are maintained a desired, preselected distance apart.

5. In apparatus for providing amplification by stimulated emission of radiation, the combination which comprises, an interferometer cavity including a pair of reflecting members, a supporting structure which supports the reflecting members, adjustable means for presetting the reflecting members a desired distance apart, means in thermal contact with the supporting structure and directly responsive to changes in the temperature of the supporting structure for producing an electrical signal having an amplitude corresponding to the change in temperature and having a polarity corresponding to the direction of change, and means responsive to the signal for altering the length of the support structure so that the length thereof is maintained constant and the reflecting members are maintained the desired, preseleced distance apart.

6. In apparatus for maintaining a desired spacing, the combination which comprises a pair of reference surfaces, a supporting structure which supports said surfaces, means coupled with the supporting structure and directly responsive to changes in length of the supporting structure induced by vibration for producing an electrical signal having an amplitude corresponding to the change in length and having a polarity corresponding to the direction of change, and means responsive to the signal for altering the length of the support structure so that the length thereof is maintained constant and the reference surfaces are maintained a desired distance apart.

References Cited by the Examiner

UNITED STATES PATENTS

| | | | |
|---|---|---|---|
| 2,785,356 | 3/1957 | Nisle | 336—136 X |
| 3,035,492 | 5/1962 | Blythe | 88—61 |
| 3,136,954 | 6/1964 | Frohlich | 331—94.5 |
| 3,149,290 | 9/1964 | Bennett et al. | 331—94.5 |
| 3,170,122 | 2/1965 | Bennett | 331—94.5 |

OTHER REFERENCES

Bennett et al., "Magnetostrictively Tuned Optical Maser," Review of Scientific Instruments, volume 33, June 1962, pages 601 to 605.

Bennett, "Gaseous Optical Masers," Applied Optics Supplement on Optical Masers, December 1962, pages 27 and 28.

Bennett, "Hole Burning Effects in an He-Ne Optical Maser," Physical Review, volume 126, No. 2, April 15, 1962, pages 580 to 593.

Cook et al., "An Automatic Fringe Counting Interferometer for Use in the Calibration of Line Scales," J. of Research of the N.B.S., volume 65c, No. 2, April–June 1961, pages 129 to 140.

Green et al., "Recording Interferometric Dilatometer," Instruments and Control Systems, volume 32, June 1959, pages 882 to 885.

Herriott, "Optical Properties of a Continuous Helium-Neon Optical Maser," Journal of the Optical Society of America, volume 52, No. 1, January 1962, pages 31 to 37.

Javan et al., "Population Inversion and Continuous Optical Maser Oscillation in a Gas Discharge Containing an He-Ne Mixture," Physical Review Letters, volume 6, No. 3, February 1, 1961, pages 106–110.

Killpatrick et al., "Alignment Characteristics of a Helium-Neon Optical Maser," Proc. of the IRE, volume 50, No. 6, June 1962, page 1521.

Laine, "A Proposal for a Tunable Source of Radiation for the Far Infra-Red Using Beats Between Optical Masers," Nature, volume 191, August 1961, pages 795 and 796.

Ramsay et al., "Barium Titanate Ceramics for Fine-Movement Control," Journal of Scientific Instruments, volume 39, No. 12, December 1962, pages 636 and 637.

Ramsay, "A Rapid-Scanning Fabry-Perot Interferometer with Automatic Parallelism Control," Applied Optics, July 1962, volume 1, No. 4, pages 411 to 413.

JEWELL H. PEDERSEN, *Primary Examiner.*

J. L. CHASKIN, R. L. WIBERT, *Assistant Examiners.*